(12) United States Patent
Zhu et al.

(10) Patent No.: US 8,233,243 B2
(45) Date of Patent: Jul. 31, 2012

(54) HEAD SUSPENSION ASSEMBLY INTERCONNECT FOR A DATA STORAGE DEVICE

(75) Inventors: Hong Zhu, Bloomington, MN (US); Michael E. Wissbaum, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 724 days.

(21) Appl. No.: 12/331,606

(22) Filed: Dec. 10, 2008

(65) Prior Publication Data

US 2010/0142095 A1 Jun. 10, 2010

(51) Int. Cl.
*G11B 22/08* (2006.01)
*G11B 5/55* (2006.01)

(52) U.S. Cl. .............. 360/266.1; 360/244.6; 360/244.2; 360/245.1; 360/265.9; 360/244.7

(58) Field of Classification Search .............. 360/266.1, 360/244.6, 244.7, 244.2, 245.1, 265.9
See application file for complete search history.

(56) References Cited

U.S. PATENT DOCUMENTS

| | | | | |
|---|---|---|---|---|
| 4,991,045 A * | 2/1991 | Oberg | ........................ | 360/244.3 |
| 5,027,241 A * | 6/1991 | Hatch et al. | .................. | 360/255 |
| 5,172,286 A * | 12/1992 | Jurgenson | .................. | 360/244.6 |
| 5,185,683 A * | 2/1993 | Oberg et al. | .............. | 360/244.6 |
| 5,208,712 A * | 5/1993 | Hatch et al. | ................ | 360/98.01 |
| 5,282,103 A * | 1/1994 | Hatch et al. | ................... | 360/245 |
| 5,291,360 A * | 3/1994 | Foote | ........................ | 360/244.5 |
| 5,299,081 A * | 3/1994 | Hatch et al. | ................ | 360/244.2 |
| 5,313,355 A | 5/1994 | Hagen | ........................ | 360/104 |
| 5,508,860 A * | 4/1996 | Takagi et al. | ............. | 360/97.01 |
| 5,512,725 A | 4/1996 | Kelemen et al. | ........ | 219/121.64 |
| 5,529,404 A | 6/1996 | Robinson et al. | ............. | 384/617 |
| 5,621,590 A * | 4/1997 | Pace et al. | .................. | 360/244.6 |
| 5,661,619 A * | 8/1997 | Goss | ........................ | 360/245.1 |
| 5,717,549 A * | 2/1998 | Jurgenson | .................. | 360/266.1 |
| 5,731,932 A * | 3/1998 | Crane | ........................ | 360/244.5 |
| 5,757,586 A | 5/1998 | Budde | ........................ | 360/104 |
| 5,759,418 A * | 6/1998 | Frater et al. | .................... | 216/22 |
| 5,808,836 A * | 9/1998 | Frater et al. | ................ | 360/244.9 |
| 5,835,311 A * | 11/1998 | Brooks et al. | ............. | 360/265.9 |
| 5,896,245 A | 4/1999 | Aoyagi et al. | ............... | 360/104 |
| 5,921,131 A * | 7/1999 | Stange | ........................ | 72/379.2 |
| 5,936,802 A * | 8/1999 | Koizumi et al. | ........... | 360/245.9 |
| 5,946,164 A * | 8/1999 | Tracy | ........................ | 360/244.5 |
| 5,956,210 A * | 9/1999 | Kaneko | ..................... | 360/244.6 |
| 5,959,807 A * | 9/1999 | Jurgenson | .................. | 360/245.7 |
| 5,963,383 A * | 10/1999 | Jurgenson | .................. | 360/244.6 |
| 6,052,260 A | 4/2000 | Segar et al. | .................... | 360/104 |
| 6,064,550 A * | 5/2000 | Koganezawa | .............. | 360/294.3 |
| 6,087,620 A * | 7/2000 | Brooks et al. | ............ | 219/121.64 |
| 6,134,085 A | 10/2000 | Wong et al. | ................ | 360/244.5 |
| 6,147,839 A * | 11/2000 | Girard | ........................ | 360/244.8 |

(Continued)

*Primary Examiner* — Viet Q Nguyen
(74) *Attorney, Agent, or Firm* — Deirdre Megley Kvale; Westman, Champlin & Kelly, P.A.

(57) ABSTRACT

Interconnections for attaching a suspension assembly to an arm of an actuator or positioning device are disclosed. In illustrated embodiments, the interconnection includes one or more weld connections formed along opposed side seams of overlapping portions of the arm and head suspension assembly. In illustrated embodiments, the weld connections are formed along side surfaces generally transverse to upper and lower surfaces of the arm. In another embodiment, a groove pattern is formed, for example via a laser etching process, in an overlapping portion of the head suspension assembly or arm and an epoxy is inlayed in the groove to connect the head suspension assembly and arm. Illustrated embodiments also include multiple connections including, for example, a swage connection and a weld or other connection.

20 Claims, 17 Drawing Sheets

U.S. PATENT DOCUMENTS

| | | | |
|---|---|---|---|
| 6,166,886 A * | 12/2000 | Toensing | 360/244.5 |
| 6,172,852 B1 | 1/2001 | Boutaghou et al. | 360/244.5 |
| 6,215,625 B1 * | 4/2001 | Carlson | 360/244.7 |
| 6,230,959 B1 * | 5/2001 | Heist et al. | 228/155 |
| 6,407,888 B1 | 6/2002 | Crane | 360/244.5 |
| 6,417,993 B1 | 7/2002 | Kant et al. | 360/244.6 |
| 6,634,084 B1 | 10/2003 | Schmidt et al. | |
| 6,728,072 B1 * | 4/2004 | Van Sloun et al. | 360/244.6 |
| 6,865,058 B2 | 3/2005 | Kube et al. | 360/244.5 |
| 6,958,890 B1 * | 10/2005 | Lin et al. | 360/244.6 |
| 7,027,266 B2 * | 4/2006 | Takahashi et al. | 360/244.8 |
| 7,312,954 B1 * | 12/2007 | Leabch et al. | 360/265.2 |
| 7,466,518 B1 * | 12/2008 | Bjorstrom et al. | 360/244.5 |
| 7,471,488 B1 * | 12/2008 | Zhang | 360/244.5 |
| 7,619,856 B2 * | 11/2009 | Matsumoto et al. | 360/234.5 |
| 7,679,241 B2 * | 3/2010 | Park | 310/81 |
| 7,697,241 B2 * | 4/2010 | Pottebaum et al. | 360/266 |
| 2002/0051318 A1 | 5/2002 | Kant et al. | 360/244.6 |
| 2003/0086206 A1 | 5/2003 | Kube et al. | 360/244.5 |
| 2005/0057860 A1 | 3/2005 | Lau et al. | 360/265.7 |
| 2006/0162147 A1 | 7/2006 | Zachmeyer | 29/603.03 |

* cited by examiner

US 8,233,243 B2

HEAD SUSPENSION ASSEMBLY INTERCONNECT FOR A DATA STORAGE DEVICE

BACKGROUND

Data storage devices store digitally encoded information or data on a storage medium. Heads are coupled to an actuator arm or assembly to read data from or write data to the storage medium. The head is coupled to the actuator arm or assembly through a head suspension assembly, which is connected to the arm. Typically, the head suspension assembly is connected to the arm via a swaging process. For read or write operations, the arm is actuated to position heads relative to data tracks on the storage medium. In order to increase storage capacity, the tracks per inch or track density of the data storage medium is increasing. Typical swage connections produce insufficient boundary conditions that cause windage driven vibration modes, which interfere with read/write operations at higher track densities. Embodiments of the present invention provide solutions to these and other problems, and offer other advantages over the prior art.

SUMMARY OF THE INVENTION

The present application discloses embodiments of an assembly for connecting head suspension assemblies to arms of a data storage device. As disclosed, a head suspension assembly includes one or more transducer elements to read data from and/or writing data to a storage media. As disclosed, the head suspension assembly coextends along a distal portion of the arm to form an overlapping portions for connecting the head suspension assembly to the arm. In an illustrated embodiment, the head suspension assembly is connected to the arm via one or more weld connections formed along opposed side seams of the overlapping portions of the head suspension assembly and the arm. In illustrated embodiments, the weld connections are formed along side surfaces generally transverse to upper and lower surfaces of the arm. The one or more weld connections illustratively are formed via a laser welding technique or process. In another embodiment, a groove pattern is formed, for example via a laser etching process, in an overlapping surface of the head suspension assembly or arm. Epoxy is inlayed in the groove to connect the head suspension assembly to the arm. In another embodiment disclosed, the attachment of the head suspension assembly to the arm is formed via multiple connections along the overlapping portions of the head suspension assembly and the arm. For example, both a swage connection and weld or other connection are used to provide an interface between the head suspension assembly and arm which limits excitation of vibration modes of the head suspension assembly and arm to increase storage capacity.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
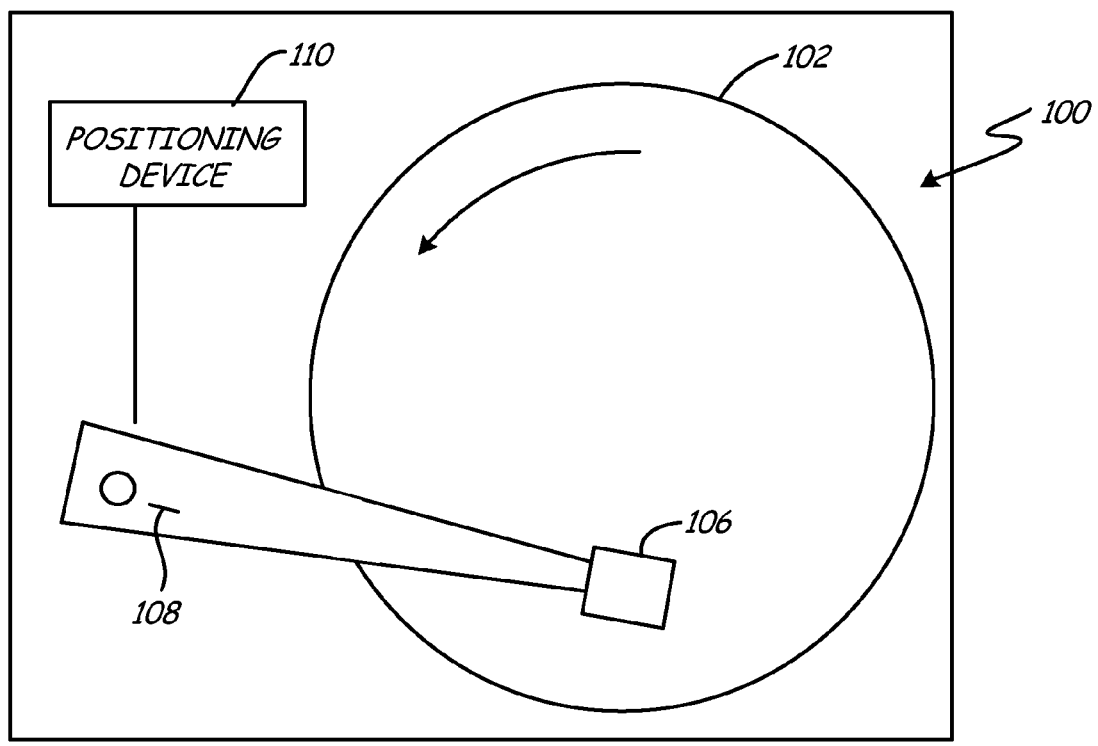
FIG. 1 is a schematic illustration of a data storage device in which embodiments of the present invention are implemented.

FIG. 1 schematically illustrates an embodiment of a data storage device 100 including a rotating disc 102 and head 106.

Data is encoded on the rotating disc 102, which is rotated via operation of a spindle motor (not shown). Illustratively, the head 106 includes one or more transducer elements to read data from or write data to the rotating disc 102. The one or more transducer elements include for example, inductive elements, magnetoresistive or other transducer elements which illustratively read or write magnetically encoded data.

In the illustrated embodiment, head 106 is coupled to an actuator arm 108. A positioning device 110 moves the arm 108 to position the head 106 relative to tracks on the rotating disc 102 for read or write operations. Although FIG. 1 illustrates one embodiment, embodiments of the present invention are not limited to a data storage device 100 including a single rotating disc 102 as shown and embodiments of the invention can be implemented for other data storage devices 100 including data storage devices having multiple discs or media.

Figure 2A:
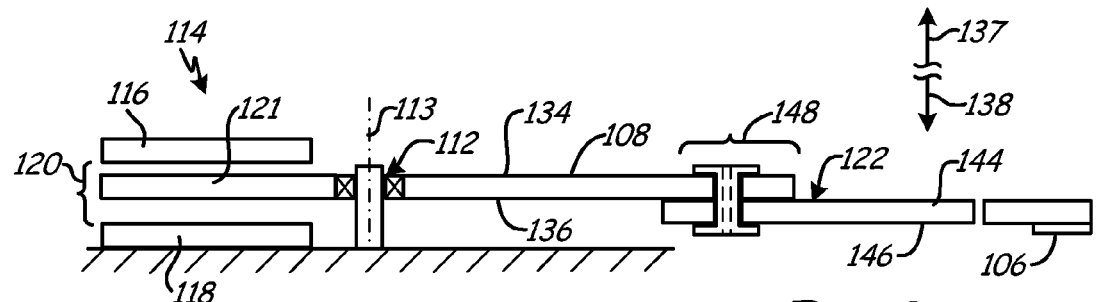
FIG. 2A is a side elevational view of an arm and head suspension assembly coupled to a base of a data storage device.
Figure 2B:
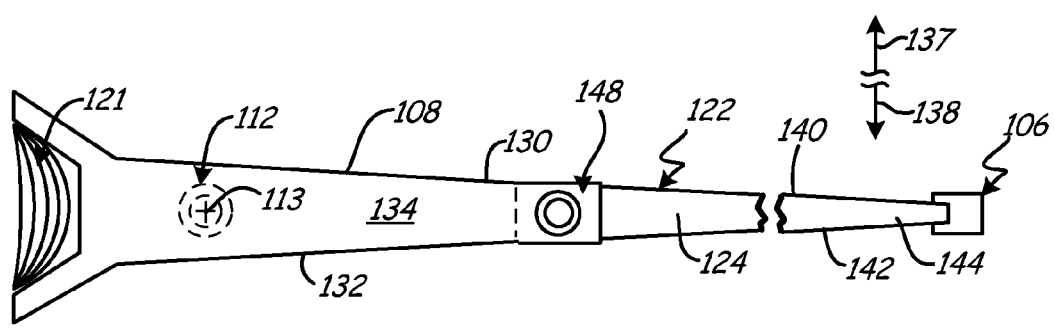
FIG. 2B is a plan view of the arm and head suspension assembly of FIG. 2A.

In the embodiment shown in FIGS. 2A-2B, the actuator arm 108 is coupled to a stationary housing or base (illustrated schematically) via a bearing assembly 112 to rotate about a pivot axis 113. In the illustrated embodiment, the positioning device 110 includes a voice coil motor 114, which rotates the arm 108 to position the head 106 relative to tracks on the disc for read and/or write operations. As shown, the voice coil motor 114 includes a plurality of magnets 116, 118 spaced to form a gap 120. A voice coil 121 coupled to the actuator arm 108 is disposed in the gap 120 between the spaced magnets 116, 118. Current is supplied to the voice coil 121 under operation of a controller as is known in the art to move or actuate the arm 108 to position the head 106 for read and/or write operations.

The head 106 is coupled to the actuator arm 108 though a head suspension assembly 122. In an illustrated embodiment, the head suspension assembly 122 includes a load beam and gimbal spring (not shown). The head 106 is coupled to the gimbal spring to form the head gimbal assembly as is known in the art. The head gimbal assembly and load beam cooperatively form the head suspension assembly 122. As shown in FIGS. 2A & 2B, the arm 108 includes an elongate body having a width that extends between opposed first and second sides 130, 132 and a thickness dimension between upper and lower surfaces 134, 136 orientated in opposed first and second directions 137, 138.

The head suspension assembly 122 includes an elongate suspension having a width that extends between first and second sides 140, 142 and a thickness dimension between upper and lower surfaces 144, 146 orientated in the first and second directions 137, 138. The head suspension assembly 122 includes a proximal end portion that overlaps a distal end portion of arm 108 to form overlapping portions 148 of the head suspension assembly 122 and arm 108. Swaging techniques are typically used to connect the arm 108 and suspension assembly 122 along the overlapping portions 148. In particular, typically the suspension assembly 122 includes a base plate (not separately shown), which overlaps the distal portion of the arm 108 and is swaged to the arm 108 to connect the suspension assembly to the arm 108.

Figure 3A:
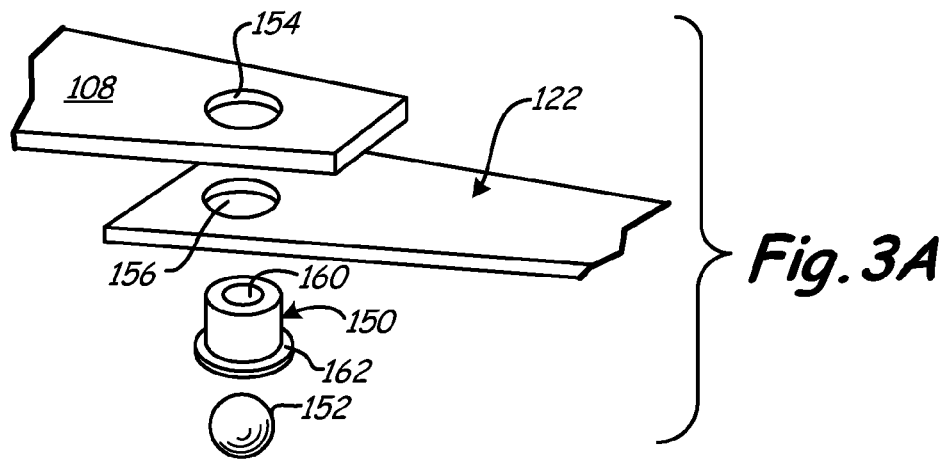
FIGS. 3A-3C illustrate a swage connection for connecting a head suspension assembly to an actuator arm.
Figure 3B:
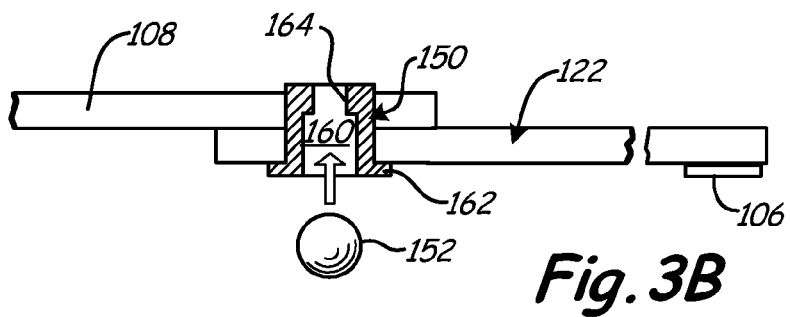
Figure 3C:
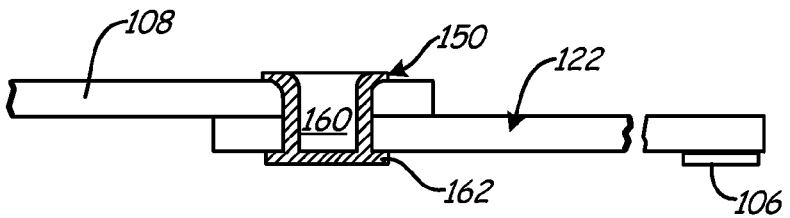

FIGS. 3A-3C, illustrate an embodiment of a swaging process that utilizes a tubular stake 150 and a swaging ball 152. As shown, the tubular stake 150 is inserted into coaxially aligned swage openings 154, 156 on the actuator arm 108 and head suspension assembly 122, respectively, to connect the suspension assembly 122 to the arm 108. Typically, as previously described, the suspension assembly includes a base plate (not shown) which overlaps with the opening 154 in the arm 108 to swage the suspension assembly 122 to the arm 108. The tubular stake 150 as shown is formed of a tubular body having an outer diameter sized for inserted into the coaxially aligned swage openings 154, 156 as shown in FIG. 3A. The tubular body includes an inner channel 160 having an inner diameter (ID) sized for insertion of the swaging ball 152 therethrough. The tubular stake 150 also includes a perimeter rim 162 proximate to a first end and a constricted diameter portion 164 proximate to a second end having a smaller diameter dimension than the ID of inner channel 160.

For assembly, the tubular stake 150 is inserted into swage openings 154, 156 of the arm 108 and suspension assembly 122 so that the perimeter rim 162 abuts a surface of one of the head suspension assembly 122 or arm 108 and the constricted diameter portion 164 is aligned proximate to the other of the arm or head suspension assembly 122. As shown, the swaging ball 152 is inserted into and forced through the tubular channel 160. The constricted diameter portion 164 is sized smaller than the diameter of the swaging ball 152 so that insertion of the swaging ball 152 through the constricted diameter portion 164 deforms the tubular stake to connect the actuator arm 108 and head suspension assembly 122.

As will be appreciated by those skilled in the art, stake 150 can be formed integral with the base plate or proximal end of the head suspension assembly 122 for swaging the head suspension assembly 122 to the arm 108. Alternatively, the stake can be attached for example, via an adhesive layer or other attachment, to the head suspension assembly to swage the head suspension assembly to the arm and application of embodiments described herein are not limited to a particular swaging technique.

Figure 3D:
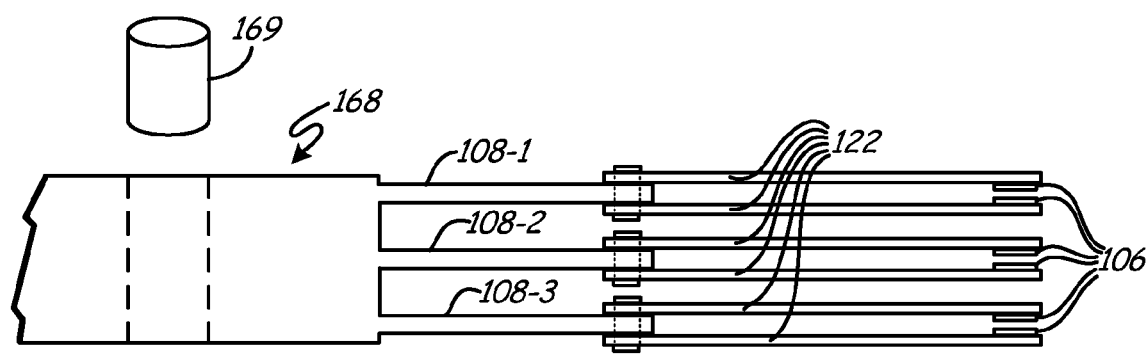
FIG. 3D illustrates an E-block and a plurality of suspension assemblies swaged to arms of the E-block.

Swaging techniques such as that described in FIGS. 3A-3C provide a method or means for attaching head suspension assemblies 122 to a plurality of actuator arms 108-1, 108-2, 108-3 of an E-block 168 as illustrated in FIG. 3D. In particular as shown, the E-block 168 includes a plurality of actuator arms 108-1, 108-2, 108-3 for supporting suspension assemblies to read data from or write data to a plurality of discs of a disc stack assembly (not shown). The E-block 168 is rotationally coupled to a stationary base or housing (not shown) via bearing assembly 169 and the head suspension assemblies 122 are swaged to distal ends of arms 108-1, 108-2, 108-3. Thus, although, the stacked arrangement of the arms limits access to the surfaces of the arms, swaging techniques provide a method for attaching suspension assemblies to a plurality of actuator arms 108-1, 108-2, 108-3 of the E-block 168.

Prior head suspension assemblies experienced windage drive excitations and bending modes. Excitation and vibration of the head suspension assemblies interferes with read/write operations. Embodiments disclosed herein provide an interconnect for the head suspension assembly to the arm to reduce excitation of vibration modes and interference with read/write operations.

Figure 4A:
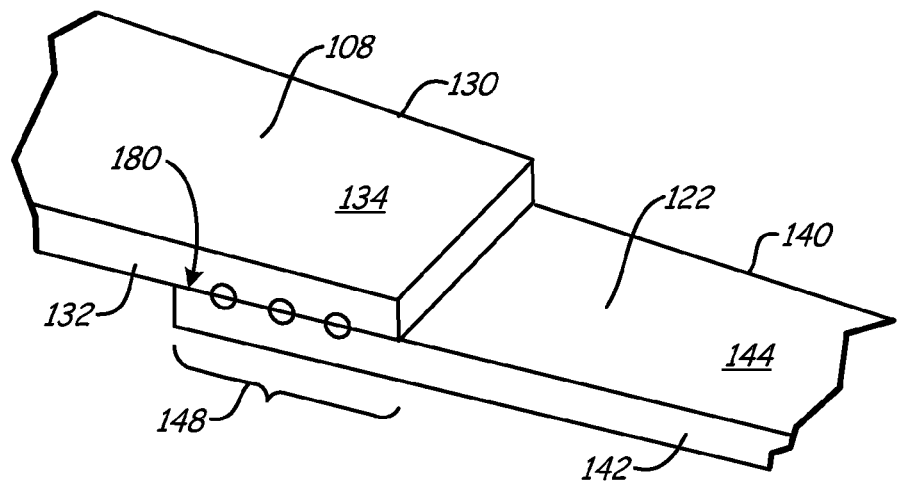
FIG. 4A illustrates an embodiment of a weld connection for connecting a head suspension assembly to an arm along opposed side seams along overlapping portions of the head suspension assembly and arm.
Figure 4B:
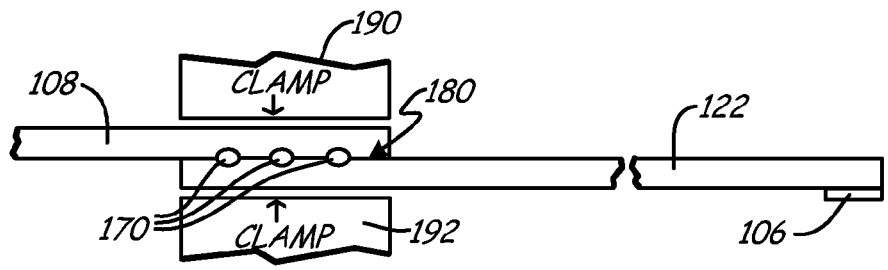
FIGS. 4B-4C are side views of the weld connection of FIG. 4A formed along opposed side seams of the overlapping portions of the head suspension assembly and arm.
Figure 4C:
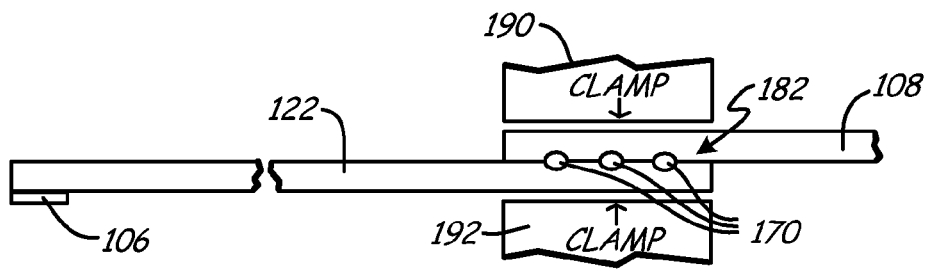

FIGS. 4A-4C illustrate one embodiment of a connection between a head suspension assembly 122 and arm 108 which has application for different data storage devices or E-block assembly 168. In the illustrated embodiment, the arm 108 and head suspension assembly 122 are connected via one or more weld connections 170 formed along the overlapping portions 148 of the head suspension assembly 122 and arm 108. In particular, as shown in FIG. 4A, a proximal end of the head suspension assembly coextends along a distal end of arm 108 so that surfaces of the arm and suspension assembly overlap forming first and second seams 180 (shown in FIG. 4B), and 182 (shown in FIG. 4C) extending along the overlapped portions of the arm 108 and head suspension assembly 122.

As shown, the weld connections 170 connecting the head suspension assembly 122 to the arm 108 are formed on coextending side surfaces of the arm and/or head suspension assembly 122 to connect the arm 108 and head suspension assembly along the first side seam 180 as illustrated in FIG. 4B and second side seam 182 as illustrated in FIG. 4C. In the illustrated embodiment shown in FIGS. 4A-4C, the weld connections 170 are formed along coextending side surfaces of the arm 108 and the head suspension assembly 122. As shown, the side surfaces of the arm and head suspension assembly are orientated in a third and a fourth direction generally transverse to the orientation of the upper and lower surfaces 134, 136 of the arm 108 and surfaces 144, 146 of the head suspension assembly 122.

As shown in FIGS. 4B-4C, the head suspension and arm are secured in overlapping alignment via upper and lower clamps 190, 192. In particular as illustrated, the upper clamp 190 provides a force in one direction and the lower clamp 192 provides a force in a second opposite direction to secure the overlapping portions, while the one or more weld connections 170 are formed along side seams 180, 182 as illustrated in FIGS. 4B and 4C. In the illustrated embodiment, the one or more weld connections 170 include a plurality of point welds spaced along the side surfaces of the arm 108 and/or head suspension assembly 122. Additional welds (not shown), for example, along the forward edge or forward end surface of the arm can be formed to reinforce the connection between the head suspension assembly 122 and the arm 108.

Figure 5:
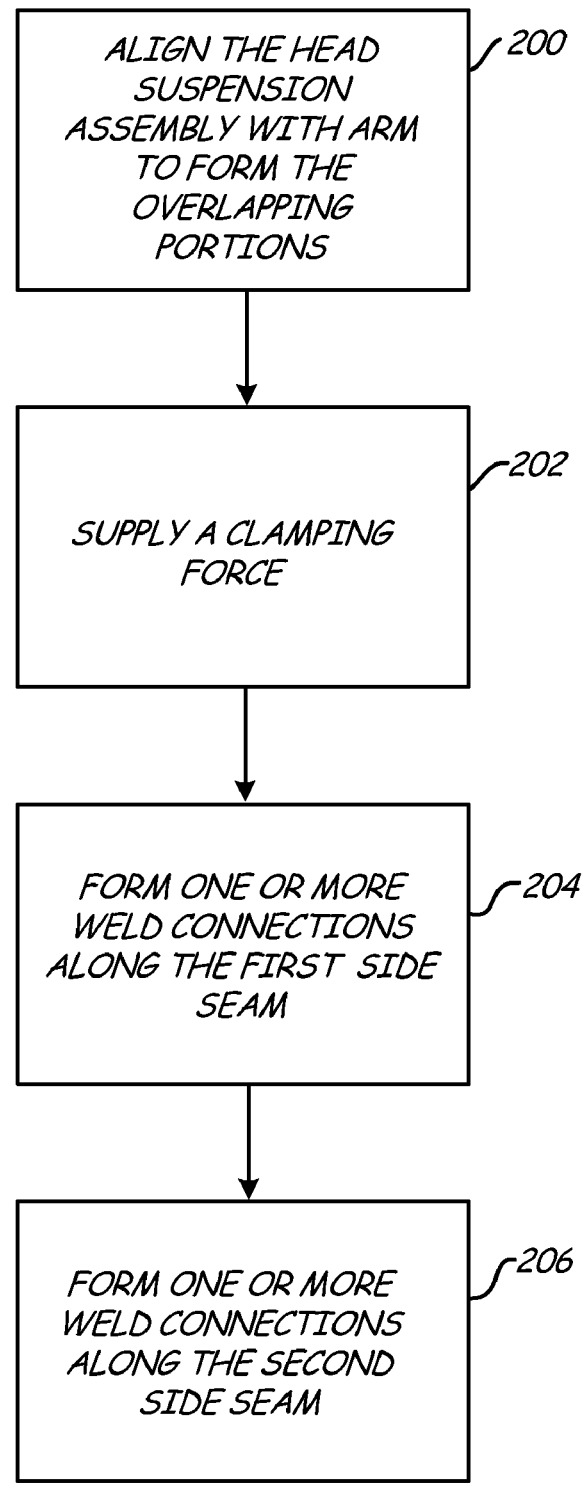
FIG. 5 is a flow diagram illustrating steps for connecting a head suspension assembly to an arm via weld connections formed along opposed side seams of the overlapping portions of the arm and head suspension assembly.

FIG. 5 illustrates steps for forming the connection as illustrated in FIGS. 4A-4C. As shown in FIG. 5, in step 200, the head suspension assembly 122 is aligned with the arm 108 to form the overlapping portions 148. A clamping force is supplied in step 202. In step 204, one or more weld connections 170 are formed along the first side seam 180 as illustrated in FIG. 4B and in step 206, one or more weld connections 170 are formed along the second side seam 182 as illustrated in FIG. 4C. In one embodiment, the one or more weld connections 170 are formed along the first and second side seams concurrently.

Alternatively, the one or more weld connections 170 are formed along the first seam 180 as illustrated in FIG. 4B and thereafter the head suspension assembly 122 and arm 108 are rotated 180 degrees and the one or more weld connections 170 are formed along the second side seam 182 as illustrated in FIG. 4C following completion of the one or more weld connections 170 formed along the first side seam 180. Illustratively, the one or more weld connections 170 utilize known welding techniques such as laser welding or other welding techniques as will be appreciated by those skilled in the art.

Figure 6A:
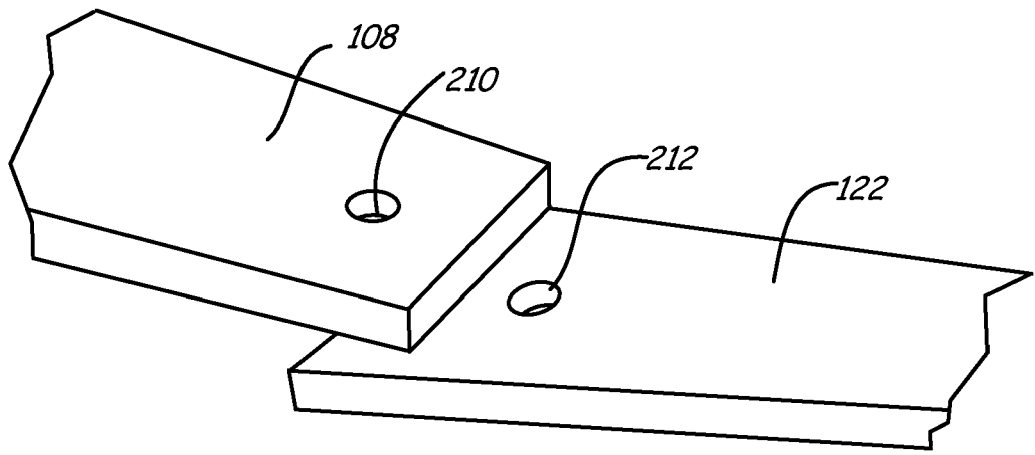
FIGS. 6A and 6B illustrate different alignment feature embodiments to align the head suspension assembly and arm for connection.
Figure 6B:
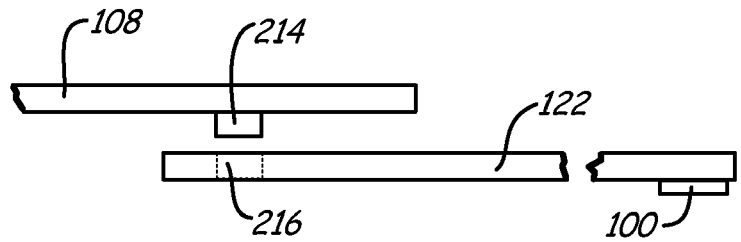

As previously described in step 200, the head suspension assembly 122 and arm 108 are aligned to form the overlapping portions 148 to connect the head suspension assembly to the arm 108. FIGS. 6A and 6B illustrate embodiments of alignment features on the head suspension assembly 122 and arm 108 to align the head suspension assembly 122 and arm 108 to form the overlapping portions 148. In the embodiment illustrated in FIG. 6A, the alignment features include an alignment hole 210 on the arm 108 and an alignment hole 212 on the head suspension assembly 122. A tool or pin (not shown) is inserted into the alignment holes 210, 212 to align the head suspension assembly relative to the arm 108 for connection.

In an alternate embodiment illustrated in FIG. 6B, the alignment features include a locating pin 214 formed on the arm 108 which aligns with a locating hole 216 on the head suspension assembly 122. Alternatively, the locating pin 214 can be formed on the head suspension assembly 122 to align with a locating hole on the arm. Following alignment of the head suspension assembly 122 relative to the arm 108, the one or more weld connections 170 are formed to connect the head suspension assembly 122 to the arm 108 as previously described.

Figure 7:
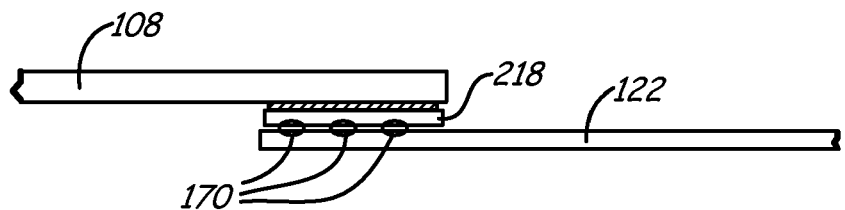
FIGS. 7-8 illustrate embodiments for connecting a head suspension and arm using one or more weld connections.

Typically, the head suspension assembly 122 is formed of a stainless steel material and the arms 108 are typically formed of an aluminum material which, reduces the mass or inertia of the arm or E-block 168. In the embodiment illustrated in FIG. 7, an interlayer 218 is attached to the aluminum arm 108, for example via a pressure sensitive adhesive or other adhesive material. In an illustrated embodiment, the interlayer 218 is formed of a thin plate made from a weldable material, such as stainless steel. The one or more weld connections 170 previously described, are formed along side surfaces (generally transverse to upper and lower surfaces of the arm 108) of the interlayer 218 or plate and side surfaces of the head suspension assembly 122 to connect the head suspension assembly 122 to the arm 108. Alternatively, the interlayer 218 is connected to the head suspension assembly and the one or more weld connections 170 are formed along side surfaces of the interlayer 218 or plate and the arm 108.

Figure 8:
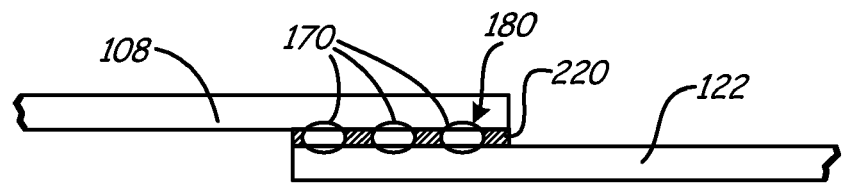

FIG. 8 illustrates another embodiment for connecting the head suspension assembly 122 to the arm 108. In the illustrated embodiment, the head suspension assembly 122 is connected to the arm 108 via an adhesive layer 220 disposed between the arm 108 and head suspension assembly 122. Additionally, as shown, the head suspension is connected to the arm via a plurality of weld connections along opposed side seams 180, 182 (only one side seam is shown in FIG. 8). Illustratively, the adhesive layer is connected to the head suspension assembly prior to attachment to the arm 108. For assembly, the head suspension assembly 122 is aligned with the arm 108 and pressure is supplied to adhesively attach the head suspension assembly 122 to the arm 108. Thereafter, one or more weld connections 170 are formed along side surfaces of the head suspension assembly or arm along the opposed side seams 180, 182.

Figure 9:
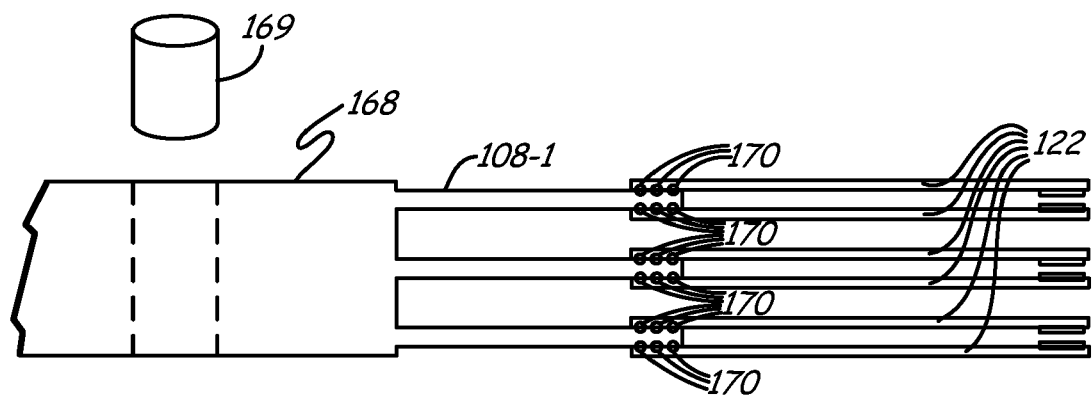
FIG. 9 illustrates an embodiment of an E-block having head suspension assemblies connected to arms of the E-block via weld connections formed along opposed side seams.

Embodiments of the illustrated weld connections can be configured for use to attach a plurality of head suspension assemblies to a plurality of actuator arms 180-1, 180-2, 180-3 of an E-block 168 as previously shown in FIG. 3D. The one or more weld connections 170 attaching the head suspension assemblies 122 to arms 108 are formed along side seams (only one shown in FIG. 9) as previously described.

Figure 10:
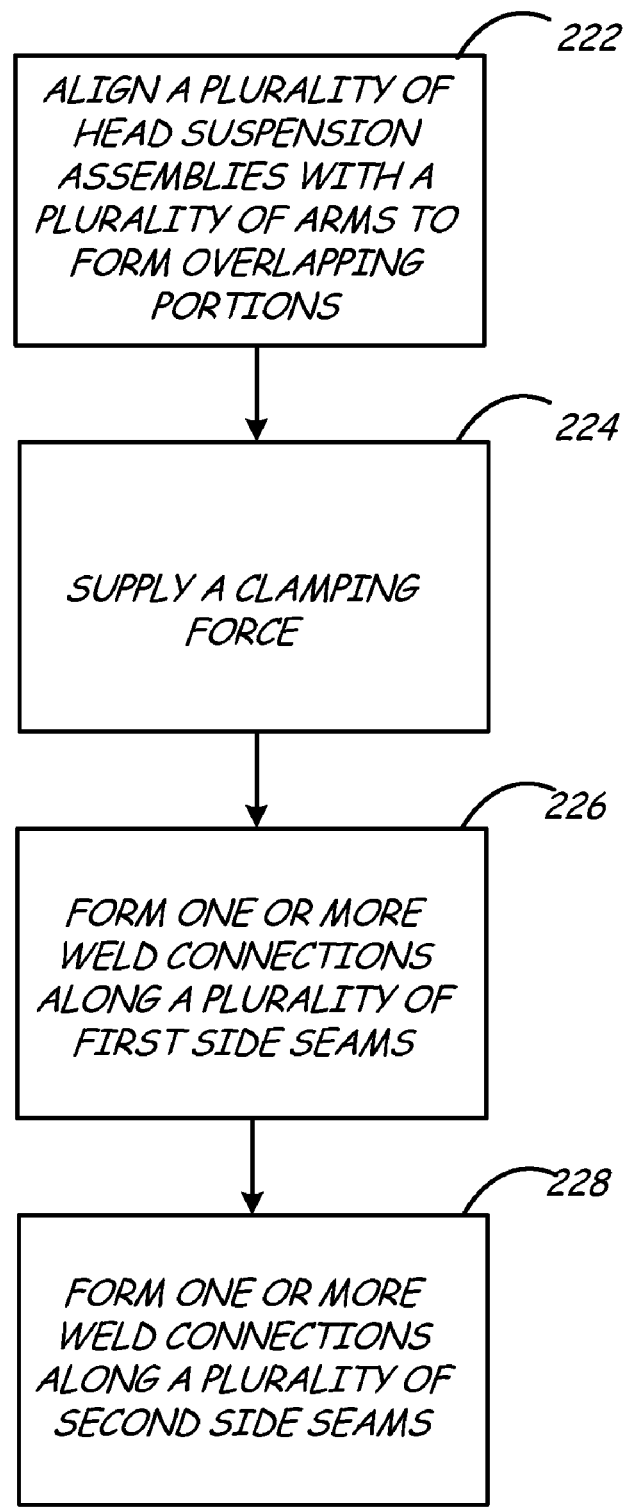
FIG. 10 is a flow diagram illustrating steps for connecting head suspension assemblies to arms of an E-block via weld connections formed along opposed side seams of the overlapping portions of the arms and head suspension assemblies.

FIG. 10 is a flow chart illustrating steps for fabricating an E-block assembly 168 including head suspension assemblies 122 attached to a plurality of arms 108. As shown in step 222, head suspension assemblies 122 are aligned relative to arms 108 to form the overlapping portions for connection of the head suspension assemblies 122 to arms 108. In step 224, clamping force is supplied to hold the head suspension assemblies in position. In step 226, one or more weld connections 170 are formed along the plurality of first side seams. In step 228, one or more weld connections 170 are formed along the plurality of second side seams. In one embodiment, the one or more weld connections 170 are formed along the plurality of first and second side seams concurrently. Alternatively, the one or more weld connections 170 are formed along the plurality of first side seams 180 and thereafter the head suspension assembly and arm are rotated 180 degrees and the one or more weld connections are formed along the plurality of second side seams 182.

Figure 11A:
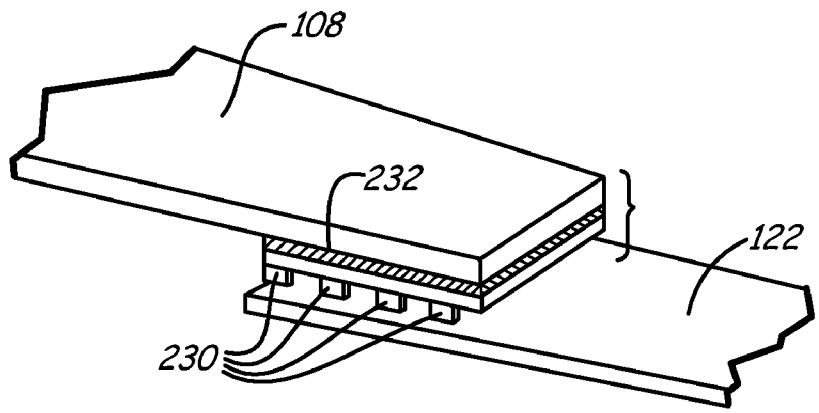
FIGS. 11A-11C cooperatively illustrate an embodiment of a connection for connecting the head suspension assembly to an arm via a plurality of tabs welded to side surfaces of the head suspension assembly.
Figure 11B:
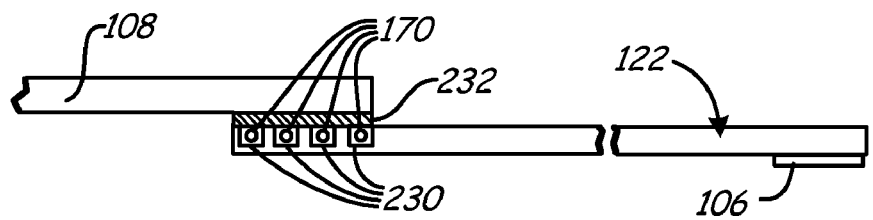
Figure 11C:
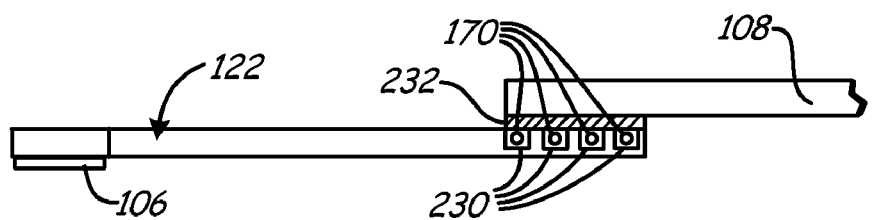

An alternative connection for connecting an overlapping portions of the head suspension assembly 122 and the arm 108 includes one or more welding tabs to form the one or more welding connections along the side seams 180, 182. In an illustrated embodiment shown in FIGS. 11A-11C, a plurality of tabs 230 are spaced along the opposed side surfaces of the head suspension assembly 122. In particular, as shown, the plurality of tabs 230 are formed on an interlayer 232 disposed between the overlapping portions of the arm and the head suspension assembly 122. Illustratively, the interlayer 232 is attached to the arm via a pressure sensitive adhesive or other adhesive. The tabs 230 extend generally transverse to the interlayer 232 (and surfaces 134, 136, 144, 146 of the arm and head suspension assembly) to form the side surface that are welded to the coextending side surfaces of the head suspension assembly as cooperatively illustrated in FIGS. 11B and 11C.

Figure 12A:
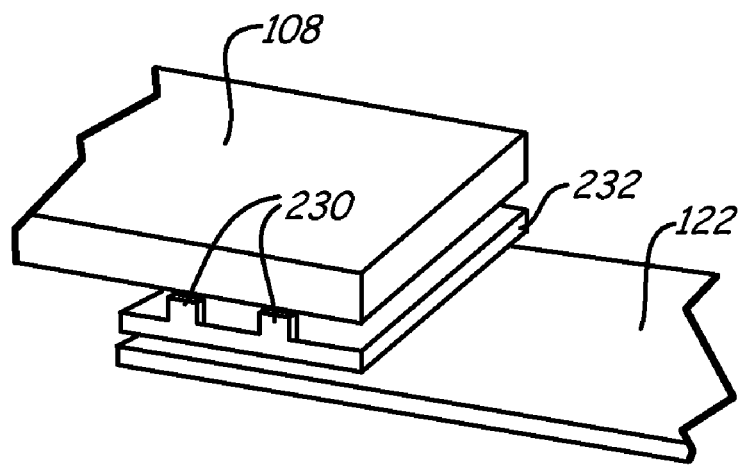
FIGS. 12A-12B illustrate different embodiments for connecting the head suspension assembly to an arm via one or more tabs welded to side surfaces of the arm or head suspension assembly.
Figure 12B:
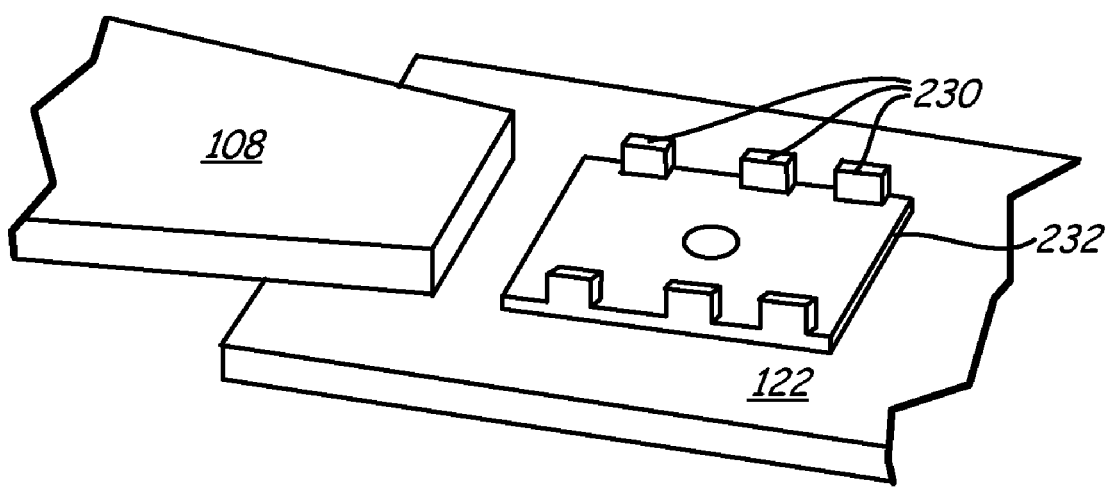

In alternate embodiments shown in FIGS. 12A and 12B, the plurality of tabs 230 are formed on interlayer 232 which is attached to head suspension assembly 122 and the tabs 230 are welded to coextending side surfaces of the arm 108. In the embodiment illustrated in FIG. 12B the width of the arm 108 is narrower than the width of the head suspension assembly 122. As shown, the interlayer 232 is sized so that tabs 230 on the interlayer 232 are spaced to align with the side surfaces of the arm 108 to weld the tabs 230 to the side surfaces of the arm 108. Alternatively, in another embodiment, the tabs 230 are integrally formed on the arm or head suspension assembly 122 and application is not limited to the specific embodiments disclosed.

Figure 13:
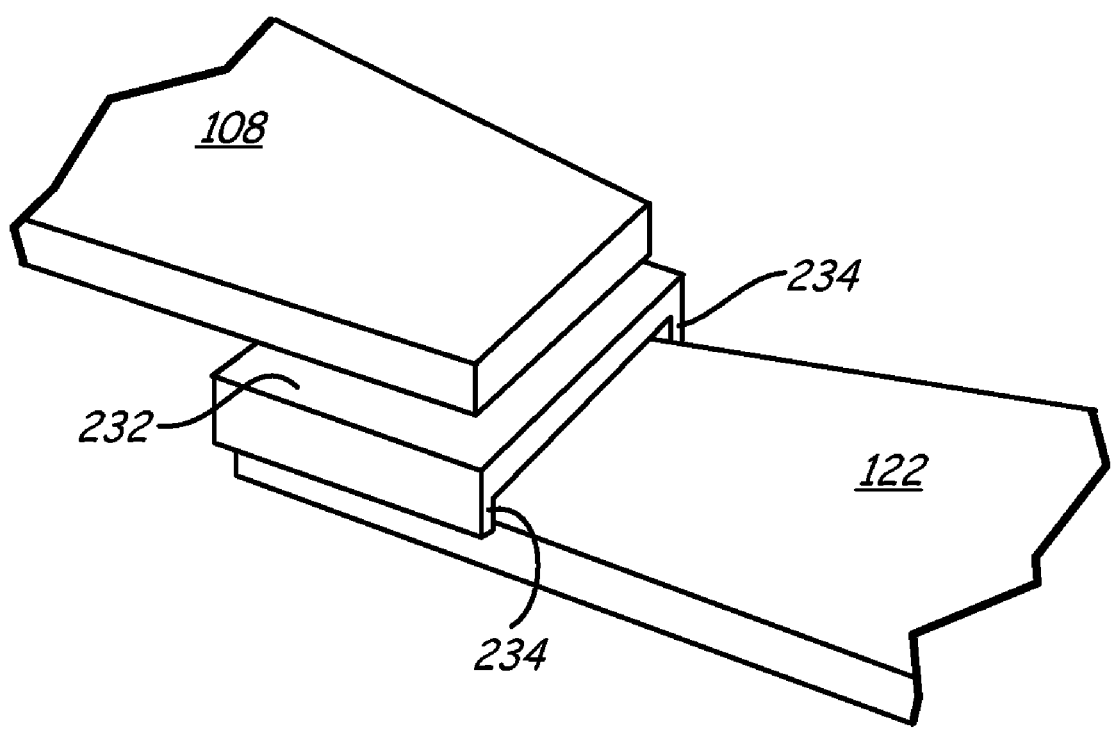
FIG. 13 illustrates an embodiment for connecting the head suspension assembly to the arm including an elongate tab welded to side surfaces of the head suspension assembly.

In the illustrated embodiments shown, a plurality of tabs 230 are formed along the side seams for attaching the head suspension assembly to the arm 108. Alternatively, in the embodiment shown in FIG. 13, a single elongate tab 234 is used to weld the head suspension assembly and arm along the side seams 180, 182. In the embodiment shown, the elongate tab 234 is formed on the interlayer 232 and extends generally transverse to the overlapping surfaces of the arm and the head suspension assembly 122 to form side surfaces to weld the head suspension assembly 122 to the arm 108. The interlayer 232 is connected to the arm 108 and the opposed tabs 234 are welded to side surfaces of the head suspension assembly 122. In an alternate embodiment, the interlayer 232 is attached to the head suspension assembly and the tabs 234 are welded to side surfaces of the arm 108 as previously described.

Figure 14A:
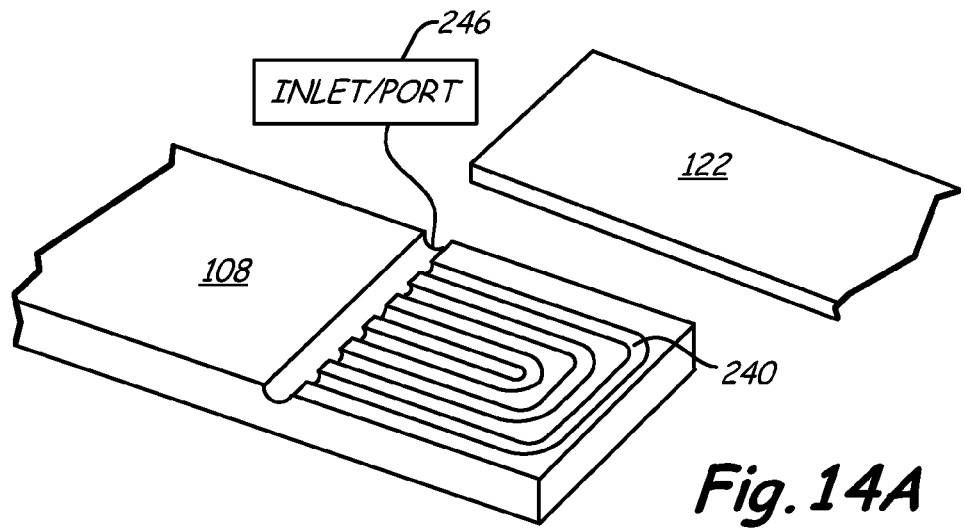
FIGS. 14A-14C illustrate an embodiment for connecting a head suspension assembly to an arm using an epoxy inlay.
Figure 14B:
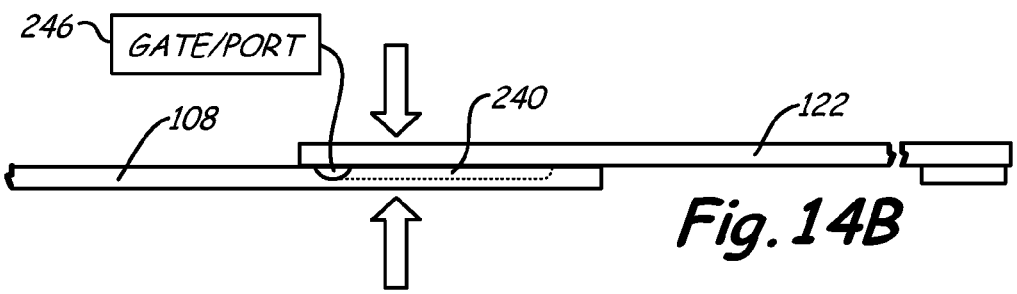
Figure 14C:
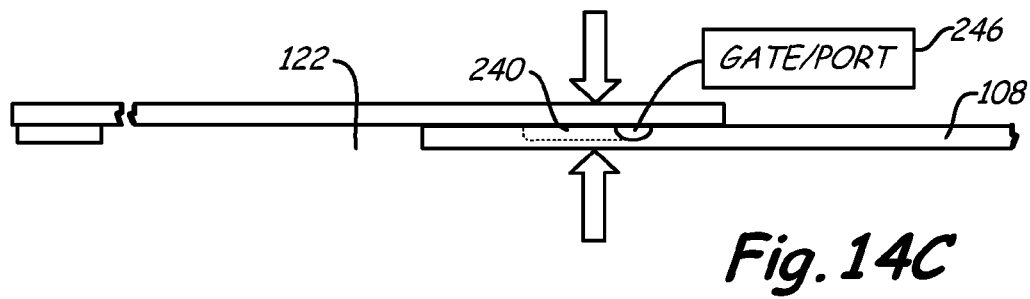

FIGS. 14A-14C illustrate an embodiment of a connection for attaching a head suspension assembly 122 to an arm 108. The connection includes a groove 240 formed on at least one of the overlapping surfaces of the arm 108 or head suspension assembly 122. An epoxy material is inlayed in the groove 240 to connect the overlapping surfaces of the arm and head suspension assembly 122. In the embodiment shown in FIG. 14A, the groove 240 is formed along an overlapping surface of arm. As shown, the overlapping surface includes a pattern of curvilinear shaped grooves 240 and a transverse groove forming a plurality of concentric channels that extend from a traverse channel. As shown the traverse channel extends to opposed sides of the arm to form an inlet or port 246 open to the plurality of concentric channels. The epoxy material is inlayed in the groove 240 to connect the overlapping surface of the head suspension assembly 122 to the overlapping surface of the arm 108.

In an illustrated embodiment, as shown, in FIGS. 14B-14C, the epoxy material can be injected through the inlet 246 at the sides. In particular, for assembly, the overlapping surface of the suspension assembly is biased against the overlapping surface of the arm while the epoxy material is injected through one or more inlets 246 to fill the groove 240. The suspension assembly is held or biased against the overlapping surface of the arm until the epoxy sets to attach the head suspension assembly 122 to the arm 108. For example, the epoxy is subjected to heat or baked at an elevated temperature to set the epoxy. In alternate embodiments, the groove pattern is formed on an overlapping surface of the head suspension assembly or both the head suspension assembly 122 and the arm 108.

Figure 15A:
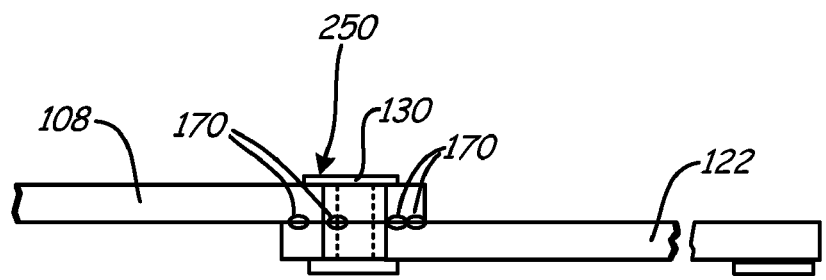
FIGS. 15A-15B illustrate an embodiment of a connection for connecting head suspension assembly to an arm using multiple connections.
Figure 15B:
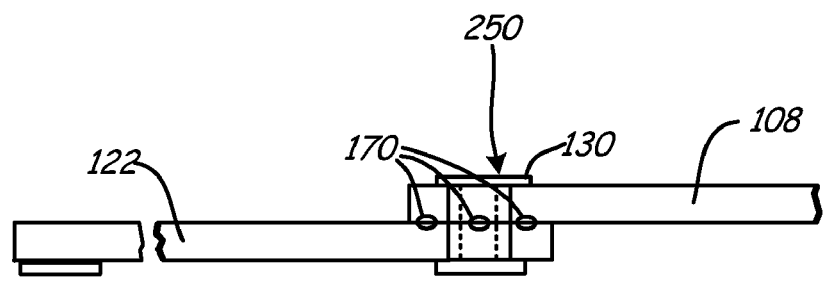

FIGS. 15A-15B illustrate an embodiment of a connection for a head suspension assembly 122 to an arm 108. As shown, the head suspension assembly 122 is swaged to the arm 108 to form the overlapping portions 148. In addition to the swage connection 250, the head suspension assembly 122 is connected to the arm via one or more weld connections 170 along opposed side seams formed along the overlapping portions. The one or more weld connections 170 provide an additional attachment along the side seams of the overlapping portions of the head suspension assembly 122 and the arm 108 to improve boundary conditions and reduce excitation of vibration modes. The illustrated connection can be used to connect suspension assemblies to a plurality of arms of an E-block 168 as previously described.

Figure 15C:
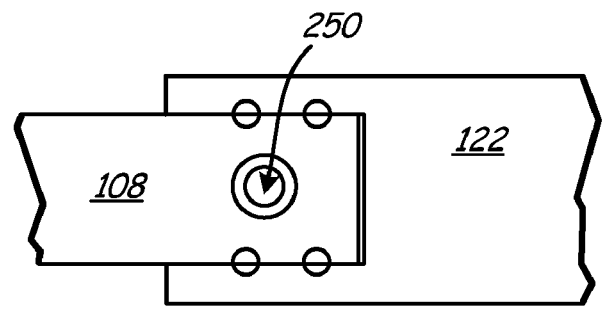
FIG. 15C illustrates another embodiment for connecting a head suspension assembly to an arm using a swage connection and welding.

FIG. 15C illustrates another embodiment similar to FIGS. 15A and 15B where the one or more weld connections are formed along edge surfaces of the arm.

Figure 16:
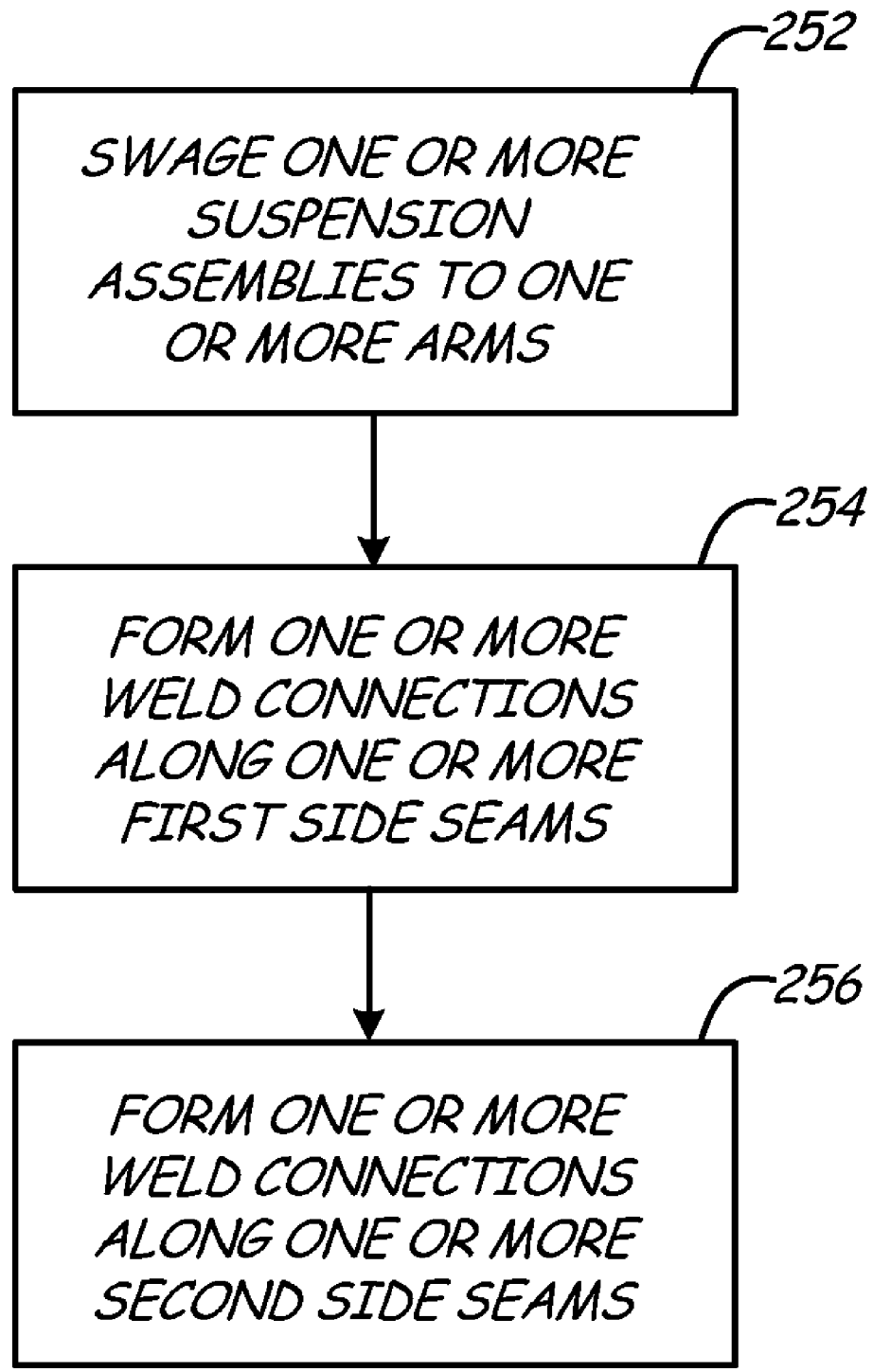
FIG. 16 is a flow diagram illustrating steps for connecting a head suspension assembly to an arm via multiple connections as illustrated in FIGS. 15A-15B.

FIG. 16 illustrates fabrication steps for attaching head suspension assemblies 122 to arms 108 using multiple connection means as illustrated in FIGS. 15A and 15B. As shown in FIG. 16, in step 252, one or more head suspension assemblies 122 are swaged to one or more arms 108. In step 254, one or more weld connections 170 are formed along one or more first side seams of the overlapping portions 148 of the one or more swaged head suspension assemblies and arms 108. In step 256 one or more weld connections are formed along one or more second side seams formed along the overlapping portions of the one or more swaged head suspension assemblies and arms 108. As previously described, the one or more weld connections 170 can be formed along first and second side seams concurrently, or alternatively, the one or more weld connections 170 are formed along the one or more first seams 180 and thereafter the head suspension assemblies and arms are rotated 180 degrees and the one or more weld connections 170 are formed along one or more second side seams 182.

Figure 17:
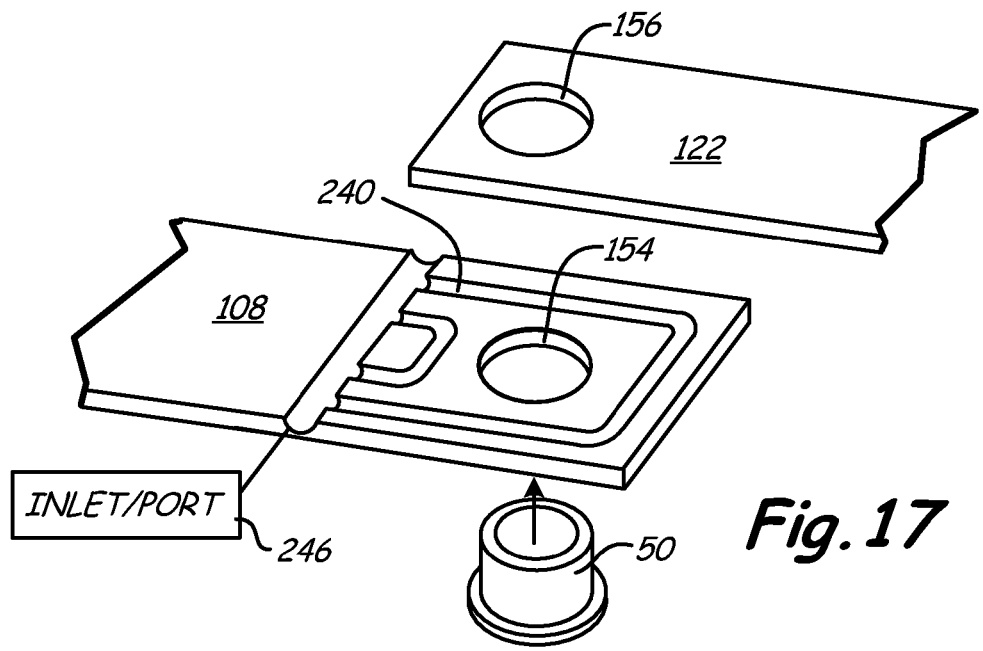
FIG. 17 illustrates an embodiment for connecting a head suspension assembly to an arm using multiple connections including a swage connection and an epoxy inlayer.

FIG. 17 illustrates another embodiment of a head suspension assembly connection where the head suspension assembly is swaged to the arm, and in addition, the head suspension assembly 122 is connected to the arm via an epoxy material inlayed in one or more grooves 240 formed in one or more overlapping surfaces of the arm. In particular, as shown, the head suspension assembly and the arm are swaged via stake 150 to connect the head suspension assembly 122 to the arm 108. Multiple head suspension assemblies (only one shown in FIG. 17) can be swaged to opposed overlapping surfaces of the arm 108. In the illustrated embodiment, grooves 240 are fabricated on the overlapping surfaces of the arm 108. Alternatively, in another embodiment, the grooves 240 are fabricated on an overlapping surface of the head suspension assembly.

Figure 18:
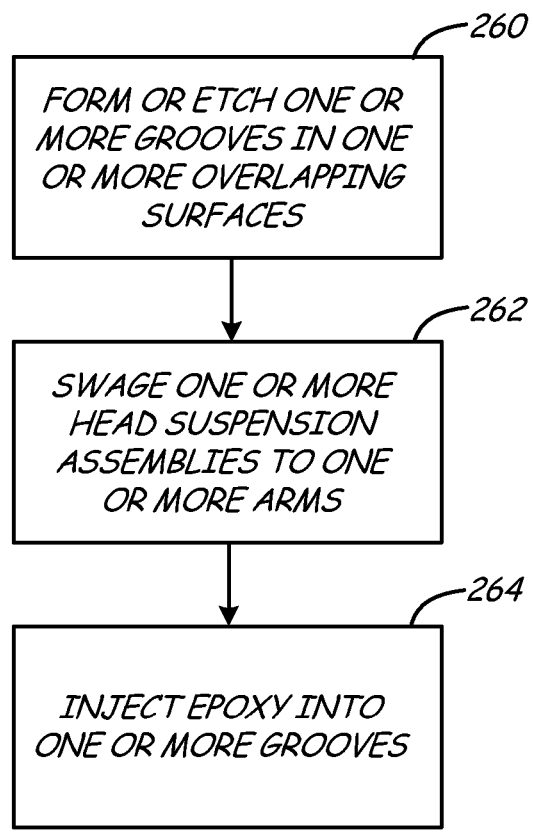
FIG. 18 is a flow diagram illustrating steps for connecting a head suspension assembly to an arm using multiple connections as illustrated in FIG. 17.

FIG. 18 illustrates assembly steps for connecting the head suspension assembly to the arm according to the embodiment illustrated in FIG. 17. In step 260, grooves 240 are formed or etched in one or more overlapping surfaces. In step 262, the one or more head suspension assemblies are aligned and swaged to the arms 108. In step 264, epoxy is injected into one or more grooves 240 to connect the one or more head suspension assemblies 122 to the one or more arms 108.

Figure 19:
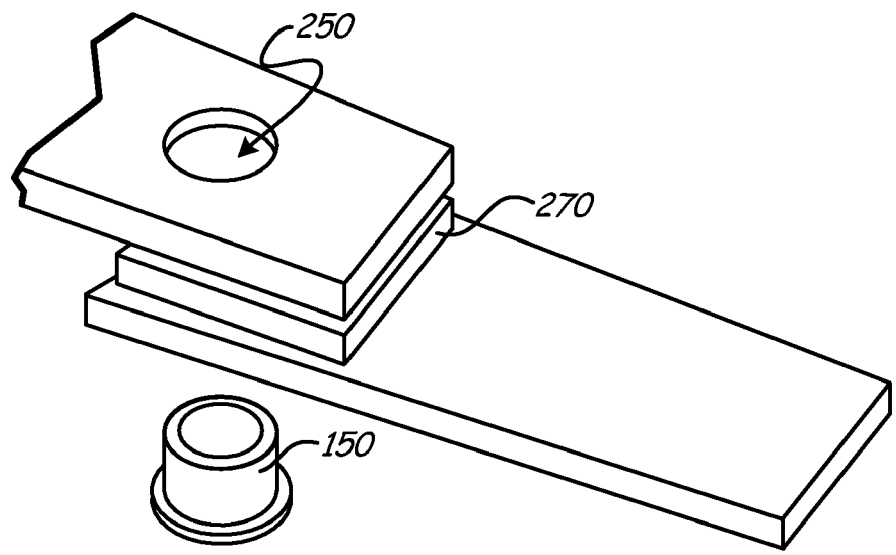
FIG. 19 illustrates an embodiment for connecting a head suspension assembly to an arm using a swage connection and an adhesive layer.

FIG. 19 illustrates another embodiment of a connection where head suspension assemblies 122 are swaged to arms 108. In the illustrated embodiment, the overlapping surfaces are adhesively connected for example, via a pressure sensitive adhesive layer 270 on the head suspension assembly to connect the head suspension assembly to the arm. Alternatively, the pressure sensitive adhesive layer 270 is formed on the arm to connect the head suspension assembly 122 to the arm 108. The pressure sensitive adhesive layer 270 provides an attachment in addition to the swaged connection 250. The illustrated connections can be used to attach a plurality of head suspension assemblies to a plurality of arms of an E-block 268.

Figure 20:
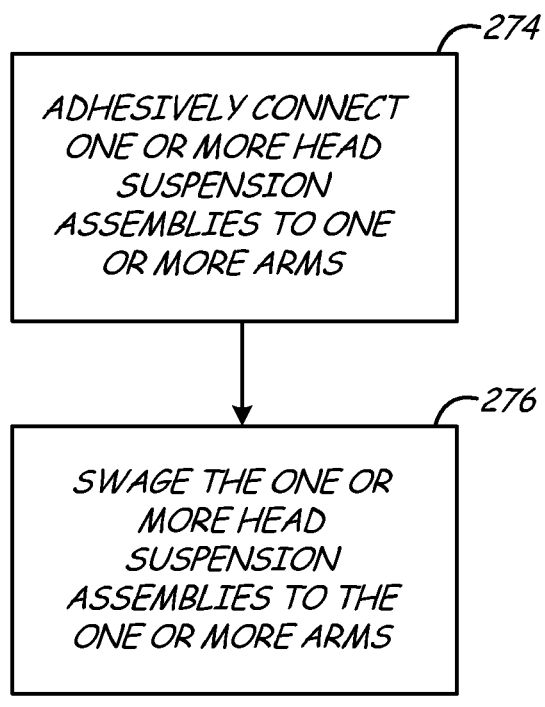
FIG. 20 is a flow diagram illustrating steps for connecting one or more head suspension assemblies to one or more arms using multiple connections as illustrated in FIG. 19.

FIG. 20 illustrates steps for fabricating the interface between the head suspension assembly 122 and arm 108 as illustrated in FIG. 19. As shown, in step 274, one or more head suspension assemblies are adhesively connected to one or more arms 108. In step 276, the one or more head suspension assemblies are swaged to one or more arms. As described, the interconnect enhances boundary conditions between the head suspension assemblies 122 and arm 108 to reduce excitation of vibration modes that interfere with performance of the device.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application, while maintaining substantially the same functionality without departing from the scope and spirit of the present invention. In addition, although embodiments described herein are illustrated with respect to a particular data storage device, it will be appreciated by those skilled in the art that the teachings of the present invention are not limited to the particular storage devices shown, and embodiments described herein can be applied to other devices without departing from the scope and spirit of the present invention.

What is claimed is:

1. An assembly comprising:
   an arm;
   a head suspension assembly overlapping the arm;
   a seam between the arm and the head suspension assembly;
   an adhesive layer having a first portion adhered to the arm and a second portion adhered to the head suspension assembly to adhesively connect the head suspension assembly to the arm along the seam; and
   a swage connection connecting the head suspension assembly to the arm at the seam adhesively connected by the adhesive layer.

2. The assembly of claim 1 wherein the adhesive layer comprises an epoxy in a groove etched in at least one of the arm and the head suspension assembly.

3. The assembly of claim 1 wherein the adhesive layer is formed of a pressure sensitive adhesive disposed in a gap between overlapping portions of the arm and the head suspension assembly.

4. The assembly of claim 1 wherein the adhesive layer is formed of an epoxy between the head suspension assembly and the arm.

5. An assembly comprising:
   an arm;
   a head suspension assembly overlapping the arm to form overlapping portions of the arm and the head suspension assembly;
   a seam between the overlapping portions of the head suspension assembly and the arm;
   a first connection formed of one of an adhesive, weld or swage connection connecting the overlapping portion of the head suspension assembly to the arm at or along the seam; and
   a second connection formed of another one of the adhesive, weld or swage connection connecting the head suspension assembly to the arm along the seam connected by the first connection.

6. The assembly of claim 5 wherein the first connection is the adhesive connection and the second connection is the swage connection connecting the head suspension assembly to the arm at or along the seam.

7. The assembly of claim 5 wherein the first connection is the adhesive connection including a pressure sensitive adhesive layer disposed in a gap along the seam between the head suspension assembly and the arm.

8. The assembly of claim 5 wherein the first connection is the adhesive connection including an epoxy disposed in a gap along the seam between the head suspension assembly and the arm.

9. A method comprising:
   adhesively connecting or welding an overlapping portion of a head suspension assembly to an arm along a seam between the head suspension assembly and the arm; and
   swaging the head suspension assembly to the arm at or along the adhesively connected or welded seam or welding the head suspension assembly to the arm at or along the adhesively connected seam.

10. The method of claim 9 wherein the method comprises swaging the head suspension assembly to the arm and wherein the swaging comprises:
    inserting a tubular stake into an opening on one or both of the arm and the head suspension assembly; and
    inserting a swaging ball through the tubular stake.

11. The method of claim 9 wherein the method comprises adhesively connecting the head suspension assembly to the arm wherein the adhesively connecting comprises:
    applying an adhesive layer to an overlapping surface of at least one of the arm or the head suspension assembly.

12. The method of claim 9 wherein the method comprises adhesively connecting the head suspension assembly to the arm and swaging the head suspension assembly to the arm following the step of adhesively connecting the head suspension assembly to the arm.

13. The method of claim 9 wherein the method comprises adhesively connecting and the step of adhesively connecting comprises:
    applying an epoxy in a gap between the arm and the head suspension assembly to connect the head suspension assembly to the arm.

14. The method of claim 9 wherein the head suspension assembly is adhesively connected to the arm and the step of adhesively connecting the head suspension assembly to the arm is prior to swaging or welding the head suspension assembly to the arm.

15. The assembly of claim 5 wherein the first connection is the adhesive connection along the seam and the second connection is the weld connection connecting the head suspension assembly to the arm along adhesively connected the seam.

16. The assembly of claim 5 wherein the first connection is the weld connection connecting the head suspension assembly to the arm along the seam and the second connection is the swage connection connecting the head suspension assembly to the arm welded to the head suspension assembly along the seam.

17. The method of claim 9 comprising adhesively connecting the head suspension assembly to the arm and welding the head suspension assembly to the arm following the step of adhesively connecting to the head suspension assembly to the arm.

18. The method of claim 9 wherein the step of adhesively connecting or welding the overlapping portion of the head suspension assembly to the arm comprises welding the overlapping portion of the head suspension assembly to the arm along the seam and the step of swaging or welding comprises swaging the head suspension assembly to the arm along the welded seam.

19. The assembly of claim 1 wherein the swage connection comprises a tubular stake having an elongate length extending across the seam to connect the head suspension assembly to the arm at the seam.

20. The assembly of claim 1 where the head suspension assembly includes a base plate and the adhesive layer and the swage connection connect the base plate of the head suspension assembly to the arm at the seam.

\* \* \* \* \*